US010999095B2

(12) United States Patent
Matsushita et al.

(10) Patent No.: US 10,999,095 B2
(45) Date of Patent: May 4, 2021

(54) COMMUNICATION METHOD (71) Applicants: FUJITSU TEN LIMITED, Kobe (JP); TOYOTA JIDOSHA KABUSHIKI KAISHA, Toyota (JP)

(72) Inventors: Naoto Matsushita, Kobe (JP); Youichi Suzuki, Toyota (JP)

(73) Assignees: DENSO TEN Limited, Kobe (JP); TOYOTA JIDOSHA KABUSHIKI KAISHA, Toyota (JP)

(*) Notice: Subject to any disclaimer, the term of this patent is extended or adjusted under 35 U.S.C. 154(b) by 144 days.

(21) Appl. No.: 15/650,351

(22) Filed: Jul. 14, 2017

(65) Prior Publication Data
US 2018/0091329 A1 Mar. 29, 2018

(30) Foreign Application Priority Data

Sep. 27, 2016 (JP) .............................. JP2016-187959

(51) Int. Cl.
*H04L 12/40* (2006.01)
*H04L 29/08* (2006.01)
(Continued)

(52) U.S. Cl.
CPC ........ *H04L 12/40* (2013.01); *H04L 12/40169* (2013.01); *H04L 12/413* (2013.01);
(Continued)

(58) Field of Classification Search
CPC ... G07C 5/008; H04L 12/40; H04L 12/40169; H04L 12/413; H04L 2012/40208;
(Continued)

(56) References Cited

U.S. PATENT DOCUMENTS

2003/0217138 A1* 11/2003 Shimba ................... H04L 29/06
709/223
2012/0306284 A1* 12/2012 Lee ....................... H04B 5/0037
307/104
(Continued)

FOREIGN PATENT DOCUMENTS

JP H06-030098 A 2/1994
JP H08-079223 A 3/1996
(Continued)

OTHER PUBLICATIONS

Apr. 3, 2018 Office Action issued in Japanese Patent Application No. 2016-187959.
(Continued)

*Primary Examiner* — Behrang Badii
*Assistant Examiner* — Daniel L Greene
(74) *Attorney, Agent, or Firm* — Oliff PLC (57) ABSTRACT

A communication method for a transmission-side node and a reception-side node performing transmission and reception via a communication line in a predetermined cycle includes: causing the transmission-side node and the reception-side node to transmit identification information indicating a status of an event of transmission of object data to the communication line in the predetermined cycle; if a new event of transmission of the object data occurs, causing the transmission-side node to update a value of the identification information and transmit the updated identification information together with the object data to the communication line in the predetermined cycle; and causing the reception-side node to receive the object data and the updated identification information, and upon completion of reception of the object data corresponding to the updated identification information, update a value of the identification information and transmit
(Continued)

the updated identification information to the communication line in the predetermined cycle.

8 Claims, 10 Drawing Sheets

(51) Int. Cl.
*H04L 12/413* (2006.01)
*H04L 12/751* (2013.01)
*H04L 12/725* (2013.01)
*H04L 12/721* (2013.01)
*H04L 12/801* (2013.01)
*H04L 12/927* (2013.01)
*G07C 5/00* (2006.01)

(52) U.S. Cl.
CPC ............ *H04L 45/02* (2013.01); *H04L 45/302* (2013.01); *H04L 45/34* (2013.01); *H04L 47/10* (2013.01); *H04L 47/801* (2013.01); *H04L 47/803* (2013.01); *H04L 67/12* (2013.01); *H04L 67/36* (2013.01); *G07C 5/008* (2013.01); *H04L 2012/40208* (2013.01); *H04L 2012/40215* (2013.01); *H04L 2012/40273* (2013.01)

(58) Field of Classification Search
CPC . H04L 2012/40215; H04L 2012/40273; H04L 45/02; H04L 45/302; H04L 45/34; H04L 47/10; H04L 47/801; H04L 47/803; H04L 67/12; H04L 67/36

See application file for complete search history.

(56) References Cited

U.S. PATENT DOCUMENTS

| | | | |
|---|---|---|---|
| 2015/0073967 A1* | 3/2015 | Katsuyama | ............ G06Q 30/08 705/37 |
| 2015/0347538 A1* | 12/2015 | Ohno | ...................... G06F 17/30 707/722 |
| 2016/0055686 A1* | 2/2016 | Ukai | ...................... G07C 5/008 701/31.5 |
| 2017/0078884 A1* | 3/2017 | Tanabe | ................ H04L 63/1466 |
| 2019/0123908 A1* | 4/2019 | Morita | .................. H04L 9/3242 |

FOREIGN PATENT DOCUMENTS

| | | |
|---|---|---|
| JP | 2004-259158 A | 9/2004 |
| JP | 2013-004237 A | 1/2013 |
| JP | 2013-046304 A | 3/2013 |
| JP | 2015-142329 A | 8/2015 |
| WO | 2009/034899 A1 | 3/2009 |

OTHER PUBLICATIONS

Takeshita et al. "Mastering TCP/IP Introductory Edition." Ohmsha, Ltd., Ed. 2, May 25, 1998, pp. 178-183.

* cited by examiner

| TIMING | EVENT STATUS | <COUNTER VALUES> | |
|---|---|---|---|
| | | TRANSMISSION SIDE | RECEPTION SIDE |
| T001 | NORMAL STATE (NO EVENT OCCURRED) | N | N |
| T002 | NORMAL STATE (NO EVENT OCCURRED) | N | N |
| T003 | NORMAL STATE (NO EVENT OCCURRED) | N | N |
| T004 | OCCURRENCE OF EVENT (DATA TRANSMISSION/RECEPTION START) | N→N+1 | N |
| T005 | EVENT UNDERWAY (DATA TRANSMISSION UNDERWAY) | N+1 | N |
| T006 | EVENT UNDERWAY (DATA TRANSMISSION UNDERWAY) | N+1 | N |
| . . | | | |
| T021 | END OF EVENT (DATA TRANSMISSION/RECEPTION END) | N+1 | N→N+1 |
| T022 | NORMAL STATE (NO EVENT OCCURRED) | N+1 | N+1 |
| T023 | NORMAL STATE (NO EVENT OCCURRED) | N+1 | N+1 |
| T024 | NORMAL STATE (NO EVENT OCCURRED) | N+1 | N+1 |
| T025 | OCCURRENCE OF EVENT (DATA TRANSMISSION/RECEPTION START) | N+1→N+2 | N+1 |
| T026 | EVENT UNDERWAY (DATA TRANSMISSION UNDERWAY) | N+2 | N+1 |
| . . | | | |
| T031 | END OF EVENT (DATA TRANSMISSION/RECEPTION END) | N+2 | N+1→N+2 |

FIG. 9

CAN-ID

001 OTHER CAN EQUIPMENT
002 OTHER CAN EQUIPMENT
003 TRANSMISSION SIDE
004 OTHER CAN EQUIPMENT
005 RECEPTION SIDE
006 OTHER CAN EQUIPMENT
007 OTHER CAN EQUIPMENT

FIG. 10

| TIMING | EVENT STATUS | <COUNTER VALUES> TRANSMISSION SIDE | RECEPTION SIDE |
|---|---|---|---|
| T001 | NORMAL STATE (NO EVENT OCCURRED) | N | N |
| T002 | NORMAL STATE (NO EVENT OCCURRED) | N | N |
| T003 | NORMAL STATE (NO EVENT OCCURRED) | N | N |
| T004 | OCCURRENCE OF EVENT (DATA TRANSMISSION/RECEPTION START) | N→M | N |
| T005 | EVENT UNDERWAY (DATA TRANSMISSION UNDERWAY) | M | N |
| T006 | EVENT UNDERWAY (DATA TRANSMISSION UNDERWAY) | M | N |
| .. | | | |
| T021 | END OF EVENT (DATA TRANSMISSION/RECEPTION END) | M | N→M |
| T022 | NORMAL STATE (NO EVENT OCCURRED) | M | M |
| T023 | NORMAL STATE (NO EVENT OCCURRED) | M | M |
| T024 | NORMAL STATE (NO EVENT OCCURRED) | M | M |
| T025 | OCCURRENCE OF EVENT (DATA TRANSMISSION/RECEPTION START) | M→N | M |
| T026 | EVENT UNDERWAY (DATA TRANSMISSION UNDERWAY) | N | M |
| .. | | | |
| T031 | END OF EVENT (DATA TRANSMISSION/RECEPTION END) | N | M→N |

F I G. 11

| TIMING | EVENT STATUS | <COUNTER VALUES> | | SCREEN DISPLAY |
|---|---|---|---|---|
| | | TRANSMISSION SIDE | RECEPTION SIDE | |
| T001 | NORMAL STATE (NO EVENT OCCURRED) | A | A | AUDIO SCREEN |
| T002 | NORMAL STATE (NO EVENT OCCURRED) | A | A | AUDIO SCREEN |
| T003 | NORMAL STATE (NO EVENT OCCURRED) | A | A | AUDIO SCREEN |
| T004 | OCCURRENCE OF EVENT (DATA TRANSMISSION/RECEPTION START) | A→B | A | AUDIO SCREEN |
| T005 | EVENT UNDERWAY (DATA TRANSMISSION UNDERWAY) | B | A | AUDIO SCREEN |
| T006 | EVENT UNDERWAY (DATA TRANSMISSION UNDERWAY) | B | A | AUDIO SCREEN |
| ... | | | | |
| T021 | END OF EVENT (DATA TRANSMISSION/RECEPTION END) | B | A→B | AUDIO SCREEN |
| T022 | NORMAL STATE (NO EVENT OCCURRED) | B | B | MENU SCREEN |
| T023 | NORMAL STATE (NO EVENT OCCURRED) | B | B | MENU SCREEN |
| T024 | NORMAL STATE (NO EVENT OCCURRED) | B | B | MENU SCREEN |
| T025 | OCCURRENCE OF EVENT (DATA TRANSMISSION/RECEPTION START) | B→C | B | MENU SCREEN |
| T026 | EVENT UNDERWAY (DATA TRANSMISSION UNDERWAY) | C | B | MENU SCREEN |
| ... | | | | |
| T031 | END OF EVENT (DATA TRANSMISSION/RECEPTION END) | C | B→C | MENU SCREEN |
| T032 | NORMAL STATE (NO EVENT OCCURRED) | C | C | NAVIGATION SCREEN |

COMMUNICATION METHOD

CROSS-REFERENCE TO RELATED APPLICATION

The present application claims priority to Japanese Patent Application No. 2016-187959, filed Sep. 27, 2016, the entire contents of which are incorporated herein by reference.

FIELD

The present invention relates to a regular communication-type communication method.

BACKGROUND

Conventionally, as a method of communication between electronic control units such as an engine ECU (electronic control unit) and a motor ECU, CAN (controller area network) communication is known. CAN communication is intended to perform communication of various types of commands and control transmitted/received by electronic control units, using a communication line called a bus, and is inexpensive and highly flexible, and is widely used as an in-vehicle network communication method.

CITATION LIST

Patent Document

[Patent document 1] Japanese Patent Laid-Open No. 2013-4237
[Patent document 2] Japanese Patent Laid-Open No. 6-30098

SUMMARY

Presently, CAN communication between electronic control units generally employs a method in which a data frame is regularly transmitted from each electronic control unit connected to a bus as a node to the bus. For example, when various pieces of information such as speed information, time information and air conditioner information are transmitted, an ID is provided to each piece of information, and each piece of information is periodically transmitted on a schedule assigned to the relevant ID. Then, an electronic control unit that uses this piece of information receives all the pieces of information sent out to the bus and selects a needed piece of information from among the pieces of information based on the IDs and discards the other pieces of information.

As mentioned above, with a method in which information to be transmitted is consistently periodically broadcasted on a bus, as the types of information communicated increases with multi-functionality of equipment controlled by an electronic control unit, a large amount of traffic is generated, resulting in scarcity of communication bands. Therefore, it is desired to terminate regular communication of data, reception of which has been completed, and thereby reduce traffic, rather than regularly communicating all of data; however, in regular communication-type communication, transmission-side node is unable to grasp a status such as a reception status in a reception-side node and thus no control to reduce traffic can be performed.

Therefore, an object of the present invention is to provide a technique that enables indication of a status of an event of transmission of object data in regular communication-type communication.

In order to achieve the object, a communication method according to the present invention is a communication method for a transmission-side node and a reception-side node performing transmission and reception via a communication line in a predetermined cycle, the method including: causing the transmission-side node and the reception-side node to transmit identification information indicating a status of an event of transmission of object data to the communication line in the predetermined cycle; if a new event of transmission of the object data occurs, causing the transmission-side node to update a value of the identification information and transmit the updated identification information together with the object data to the communication line in the predetermined cycle; and causing the reception-side node to receive the object data and the updated identification information, and upon completion of reception of the object data corresponding to the updated identification information, update a value of the identification information and transmit the updated identification information to the communication line in the predetermined cycle.

The present invention enables provision of a technique that enables indication of a status of an event of transmission of object data in regular communication-type communication.

DESCRIPTION OF EMBODIMENTS

An embodiment of the present invention will be described below with reference to the drawings. A configuration of the below-described embodiment is a mere example, and the present invention is not limited to the configuration of the embodiment.

System Configuration

Figure 1:
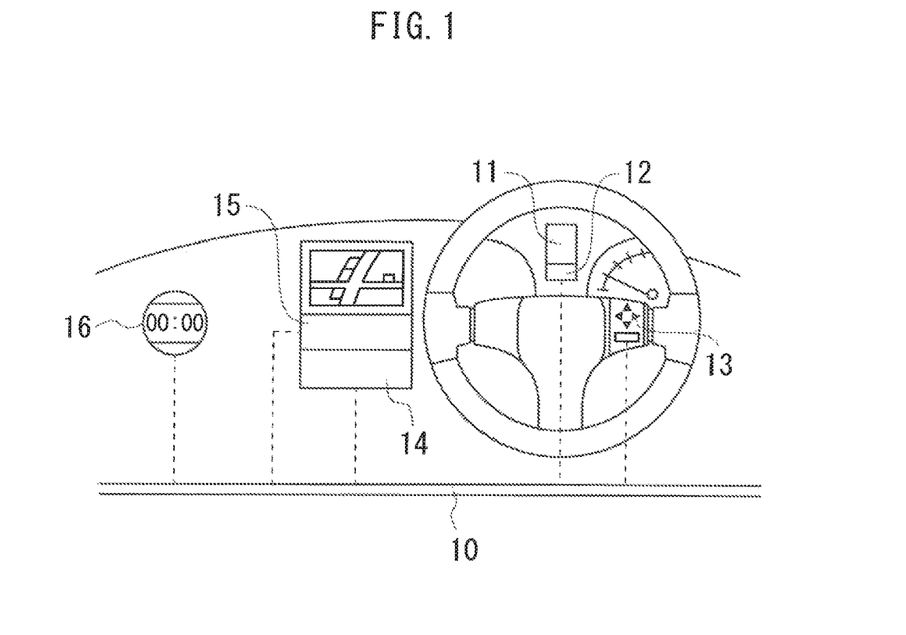
FIG. 1 is a diagram of pieces of equipment mounted in the vicinity of an instrument panel of a vehicle, the pieces of equipment being connected via a communication line and forming a CAN (controller area network).
Figure 2:
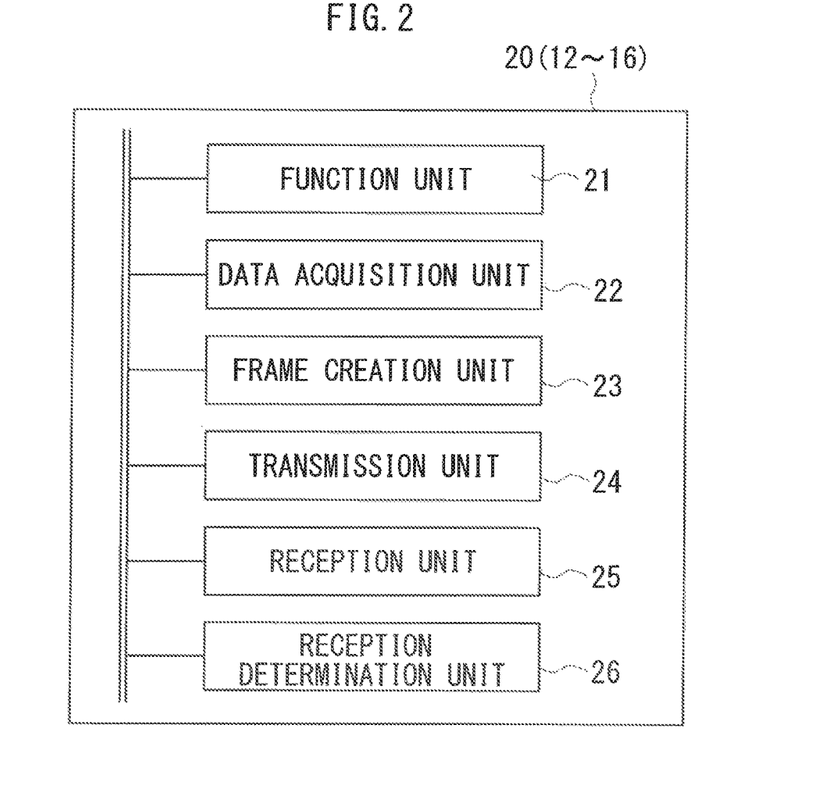
FIG. 2 is a function block diagram of a node included in the CAN.
Figure 3:
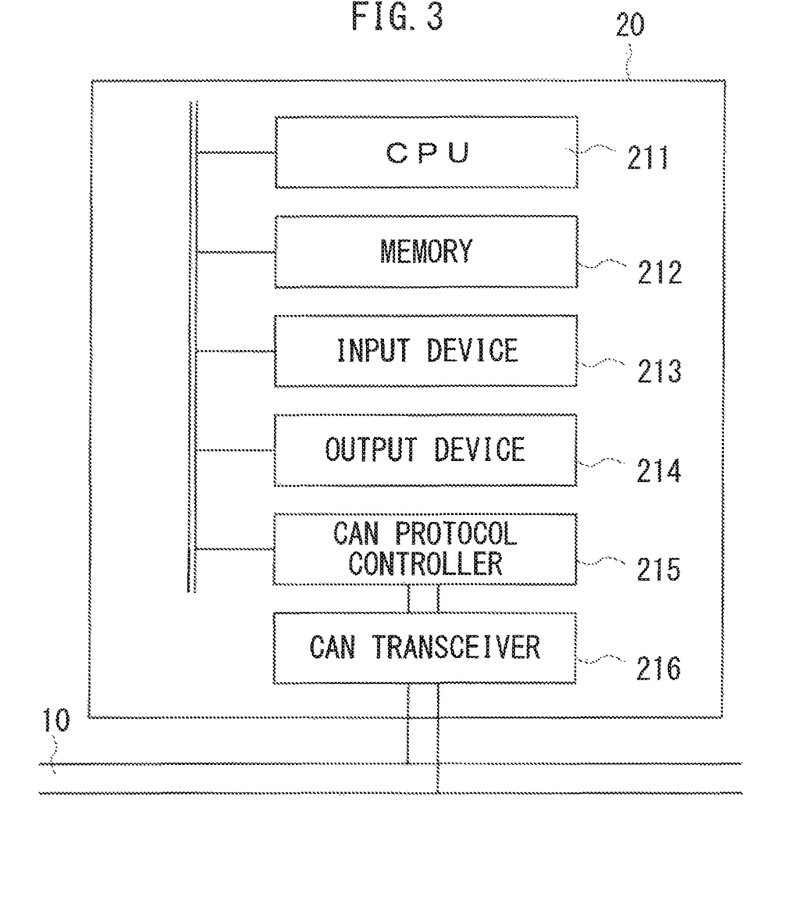
FIG. 3 is a diagram illustrating a configuration of a node connected to the communication line.
Figure 4:
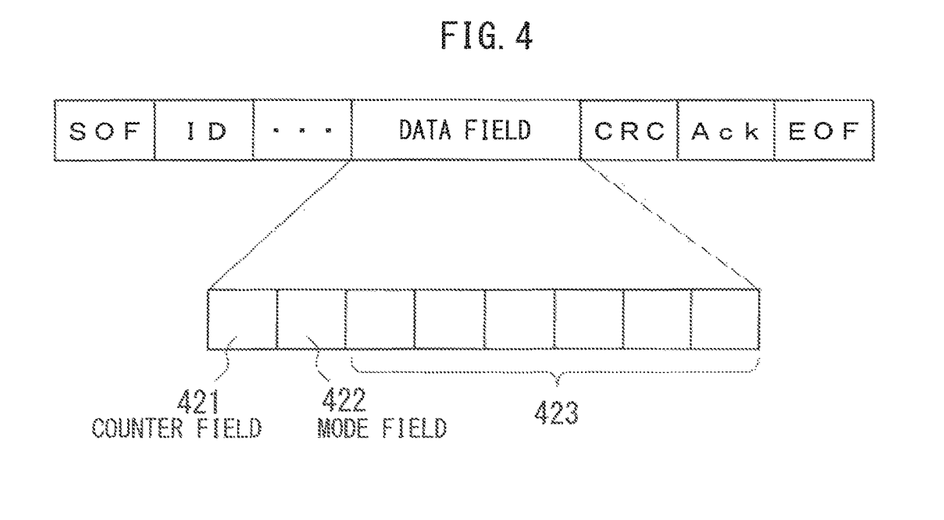
FIG. 4 is a diagram illustrating a format of a data frame.

FIG. 1 is a diagram of pieces of equipment installed in the vicinity of an instrument panel of a vehicle, the pieces of equipment being connected via a communication line and forming a CAN (controller area network), FIG. 2 is a function block diagram of a node included in the CAN, FIG. 3 is a diagram illustrating a node connected to the communication line, and FIG. 4 is a diagram illustrating a format of a data frame.

A communication method according to the present application, a data frame is sent out from a transmission-side node to a communication line in a predetermined cycle, and a reception-side node receives the data frame via the communication line. Also, in the communication method according to the present application, the transmission-side node and the reception-side node transmit/receive identification information identifying an event, in the predetermined cycle. Then, upon occurrence of a new event of transmission of object data, the transmission-side node updates the identification information to a value indicating the event, and transmits the identification information together with the object data in the predetermined cycle. The reception-side node receives the object data and the identification information, and upon completion of reception of the object data corresponding to the identification information, updates the identification information to a value corresponding to the event and transmits the identification information in the predetermined cycle.

Consequently, in the communication method according to the present application, the update of the identification information transmitted from the transmission-side node enables recognition of occurrence of an event. Subsequently, the update of the identification information transmitted from the reception-side node enables recognition of completion of all the object data. Also, it is possible to recognize that transmission of the object data relating to the occurred event is underway during a period from the update of the identification information from the transmission-side node until the update of the identification information from the reception-side node. Furthermore, it is possible to recognize that no event occurs during a period from the update of the identification information from the reception-side node until an update of identification information from the transmission-side node.

As described above, the communication method according to the present application enables indication of an event occurrence status and an object data communication status by identification information. Consequently, for example, a transmission-side node recognizes completion of reception of object data based on identification information from a reception-side node and terminates regular communication of the object data to prevent useless repetition of transmission, enabling reduction in traffic. In other words, it is possible to transmit/receive object data in response to an event while using a network employing a regular communication-type communication method.

As illustrated in FIG. 1, a communication system according to the present application includes an MID 11, a MET-ECU 12 that controls a picture on the MID 11, a steering switch 13, an in-vehicle device (information processing device) 14, an air conditioner controller 15, and a clock 16, and the pieces of equipment 12 to 16 are connected via a communication line 10 as nodes. Although FIG. 1 mainly illustrates pieces of equipment provided in the vicinity of an instrument panel, pieces of equipment in the communication system are not limited to these pieces of equipment and other pieces of equipment may also be connected as nodes.

As illustrated in FIG. 2, these pieces of equipment 12 to 16, that is, the nodes 20 connected to the communication line 10 each include a function unit 21, a data acquisition unit 22, a frame creation unit 23, a transmission unit 24, a reception unit 25 and a reception determination unit 26. Each of the nodes 20 can be a transmission-side node that transmits object data to the other nodes 20 and can be a reception-side node that receives object data from the other nodes.

The function unit 21 is intended to execute a function of the relevant piece of equipment, and, for example, in the case of the clock 16, execute a function that acquires time information and causes a time to be displayed on a display unit, and in the case of the air conditioner controller 15, control an air conditioner according to an operation performed by a user or operation information received by the reception unit 25. Also, in the in-vehicle device 14, the function unit 21 provides, e.g., audio/television (visual) and navigation functions. More specifically according to an operation performed by a user or operation information received by the reception unit 25, the function unit 21 performs reception of data from the other pieces of equipment and processing on the received data such as a play of music, selection of a television channel and calculation of a route to a destination and display of the route. Also, the function unit 21 performs output of data to be transmitted to the other pieces of equipment via the communication line such as output of a list of songs in a music album that is being played and output of route information, traffic information and warning information.

The data acquisition unit 22 acquires data that is an object to be transmitted (hereinafter also referred to as "object data") from the function unit 21.

The frame creation unit 23 creates a data frame in a predetermined format, the data frame including the object data acquired by the data acquisition unit 22. As illustrated in FIG. 4, the data frame has a format including pieces of information such as an SOF (start of frame), a CAN-ID, data, CRC (cyclic redundancy check), ACK (acknowledgement) and an EOF (end of frame).

A field 41 that stores a CAN-ID has, for example, 11 bits, and in this case, a possible range of the CAN-ID is from 0x0 to 0x7FF, and 2048 types of identification are possible based on the CAN-ID.

The data field 42 has 0 to 8 bytes, and in this example, from among the 0 to 8 bytes, 1 byte provides a field 421 that stores identification information (hereinafter also referred to as "counter information"), another 1 byte provides a field 422 that stores mode information, and 6 bytes other than the fields 421 and 422 provide a field 423 that stores data. The counter information is, for example, a 1-byte numeral value, and an event occurrence status and an object data reception state are grasped according to comparison between a value counted (counter value) in a reception-side node and a value counted (counter value) in a transmission-side node. Here, the counter information (identification information) is not limited to a numerical value and may be another value such as a code or a character string. The mode information is information indicating a mode relating to the node or the object data.

For the object data, a CAN-ID is set according to the type of the object data such as a speed, a time or screen display, and the object data and the corresponding CAN-ID are stored in the node 20 as setting information. Also, if the object data includes a plurality of component elements (also referred to as element data), a CAN-ID is set for each of these component elements, and information indicating each of the component elements corresponding to the object data, and the CAN-IDs of the component elements are also stored as setting information. The frame creation unit 23 obtains CAN-IDs of the object data and the component elements based on the setting information and adds the CAN-IDs to the data frame.

The transmission unit 24 transmits the data frame created by the frame creation unit 23 to the communication line 10.

The reception unit 25 receives data frames via the communication line 10. For example, a CAN-ID of needed data is set in advance, and the reception unit 25 receives all of data frames transmitted to the communication line 10, and selects a data frame including the set CAN-ID from among the data frames and discards the other data frames.

The reception determination unit 26 recognizes a status of reception of the data frame based on counter information in the data frame of object data identified by the CAN-ID and determines whether or not the relevant object data has completely been received. Detailed processing on identification information will be described later.

As illustrated in FIG. 3, a node 20 includes, for example, a memory 212, an input device 213, an output device 214, a CAN protocol controller (communication interface) 215 and a CAN transceiver 216 connected to a CPU 211 via a bus.

The memory 212 includes a main storage device and an auxiliary storage device. The main storage device is used as a work area for the CPU 211, a storage area for programs and data and a buffer area for communication data. The main storage device includes, for example, a random access memory (RAM) or a combination of a RAM and a read-only memory (ROM).

The auxiliary storage device stores programs to be executed by the CPU 211 and data to be used when the programs are executed. The auxiliary storage device is, for example, a hard disk drive (HDD), a solid-state drive (SSD), a flash memory or an electrically erasable programmable read-only memory (EEPROM). Also, the auxiliary storage device may include a removable storage medium that can be inserted/removed to/from the node 20. The removable storage medium is, for example, a universal serial bus (USB) memory. Also, the auxiliary storage device may include a disk storage medium such as a CD-ROM, a DVD-RUM or a DVD-R and a drive device for the disk storage medium. The disk storage medium is one of removable storage media.

The input device 213 is used to input information and/or data to the node 20. The input device 213 includes, for example, buttons, keys, a pointing device such as a mouse and/or a touch panel. The input device 213 may include a sound input device such as a microphone and/or an image input device such as a camera.

The output device 214 outputs information and data. The output device 214 is, for example, a display device or a writing device for a storage medium. The output device 214 may include a sound output device such as a speaker.

The CAN protocol controller 215 is a communication interface connected to the communication line 10 for communication with the other nodes. The CAN protocol controller 215 performs processing according to a CAN protocol such as bit stuffing, communication arbitration, error handling and CRC check.

The CAN transceiver 216 performs generation and adjustment of a transmission voltage in the communication line 10, securement of an operating current and protection of wirings.

The communication line 10 includes two wires and transmits a signal (dominant/recessive) by means of a difference in voltage between the wires.

The CPU 211 corresponds to a processing device in the present example. The CPU 211 is also called "MPU (micro-processor unit), a microprocessor or a processor. The CPU 211 is not limited to a single processor and may have a multi-processor configuration. Also, a single CPU connected via a single socket may have a multicore configuration. At least a part of the processing in the respective units may be performed by a processor other than the CPU, for example, a dedicated processor such as a digital signal processor (DSP), a graphics processing unit (GPU), a numeric processor, a vector processor or an image processor. Also, at least a part of the respective units may be an integrated circuit (IC) or another digital circuit. Also, at least a part of the respective units may include an analog circuit. The integrated circuit may include an LSI, an application specific integrated circuit (ASIC) or a programmable logic device (PLD). The PLD includes, for example, a field-programmable gate array (FPGA). Each of the units may be a combination of a processor and an integrated circuit. The combination is called, for example, an MCU (micro controller unit), an SoC (system-on-a-chip), a system LSI or a chip set.

The CPU 211 loads a program stored in the memory 212 onto the main storage device and executes the program. In the memory 212, programs called an operating system, firmware and application programs are installed.

As a result of execution of programs, the CPU 211 operates as the function unit 21, the data acquisition unit 22, the frame creation unit 23, the transmission unit 24, the reception unit 25 and the reception determination unit 26.

The above-described configuration of the node 20 is an example and addition of other configurations or omission of a part of the configuration may arbitrarily be performed.

<<Data Example>>

Figure 5A:
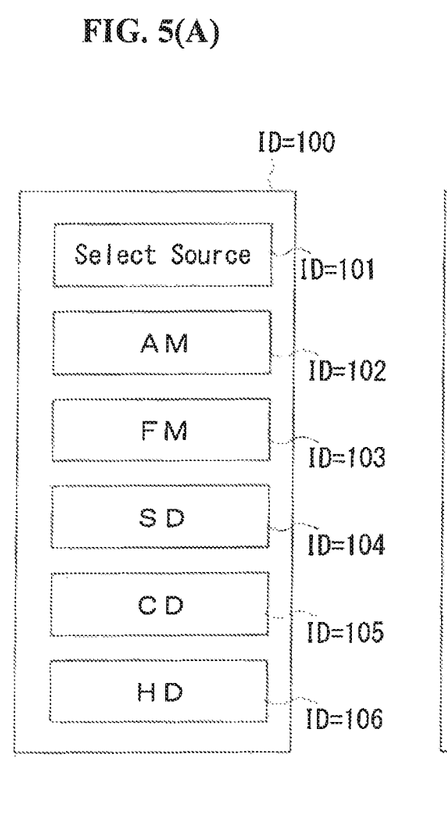
FIG. 5(A) and FIG. 5(B) include diagrams illustrating an example of a screen displayed on a MID according to object data transmitted from an in-vehicle device to a MET-ECU.
Figure 5B:
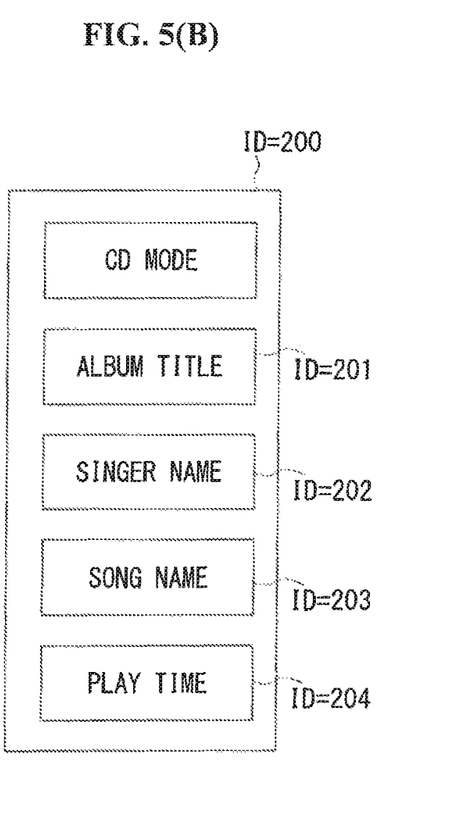

FIG. 5 includes FIG. 5(A) and FIG. 5(B) include diagrams each illustrating an example of a screen displayed on the MID 11 according to object data transmitted from the in-vehicle device 14 to the MET-ECU 12.

The object data for each screen display illustrated in FIG. 5(A) and FIG. 5(B) includes a plurality of component elements (plurality of rows). Specific CAN-IDs are assigned in advance to the screen display and the component elements, and, for example, in FIG. 5(A), a CAN-ID for an entire menu is 100, CAN-IDs for the respective rows are 101 to 106. Note that the CAN-IDs are 11-bit binary numbers, but in the example in FIG. 5(A) and FIG. 5(B), for convenience of description, the CAN-IDs are indicated by 3-digit decimal numbers. Also, in FIG. 5(B), a CAN-ID for the entire screen display is 200 and CAN-IDs for the respective rows are 201 to 204.

The assignment of the IDs is stored in advance in memories 212 of a transmission-side node and a reception-side node as setting information. Also, the setting information may include layout information such as data with a CAN-ID=101 corresponding to a first row of the screen with a CAN-ID=100 and data with a CAN-ID=102 corresponding to a second row of the screen with a CAN-ID=100.

In FIG. 5(A), a menu for selecting an audio source is displayed on the MID 11, and upon a user performing a selection operation on the menu using the steering switch 13, one of the sources on the menu is selected. For example, in FIG. 5(A), the shaded part indicates a focused row, and the position of the focus is moved up; down using the steering switch 13 to focus a desired row and select "OK" to select the source on the relevant row. In the example in FIG. 5(A), "CD" is focused and upon selection of "CD", an event of screen transition occurs and the screen display transitions to FIG. 5(B).

FIG. 5(B) is an example of a screen that displays information on a CD that is being played, on which a disk title, a singer name, a song name and a play time are displayed.

Communication Method

Figure 6:
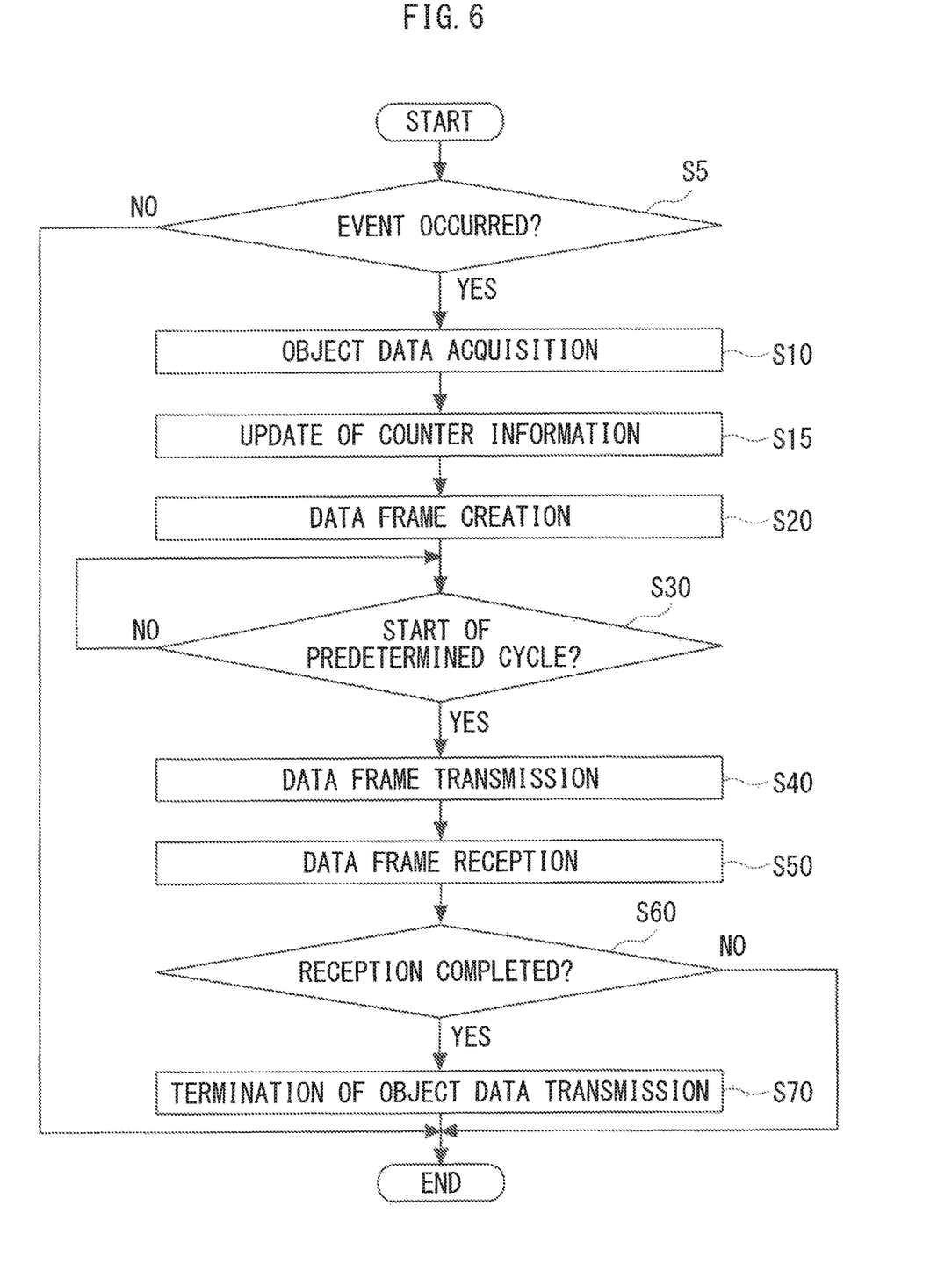
FIG. 6 is a diagram for describing processing for a transmission-side node to transmit data.
Figure 7:
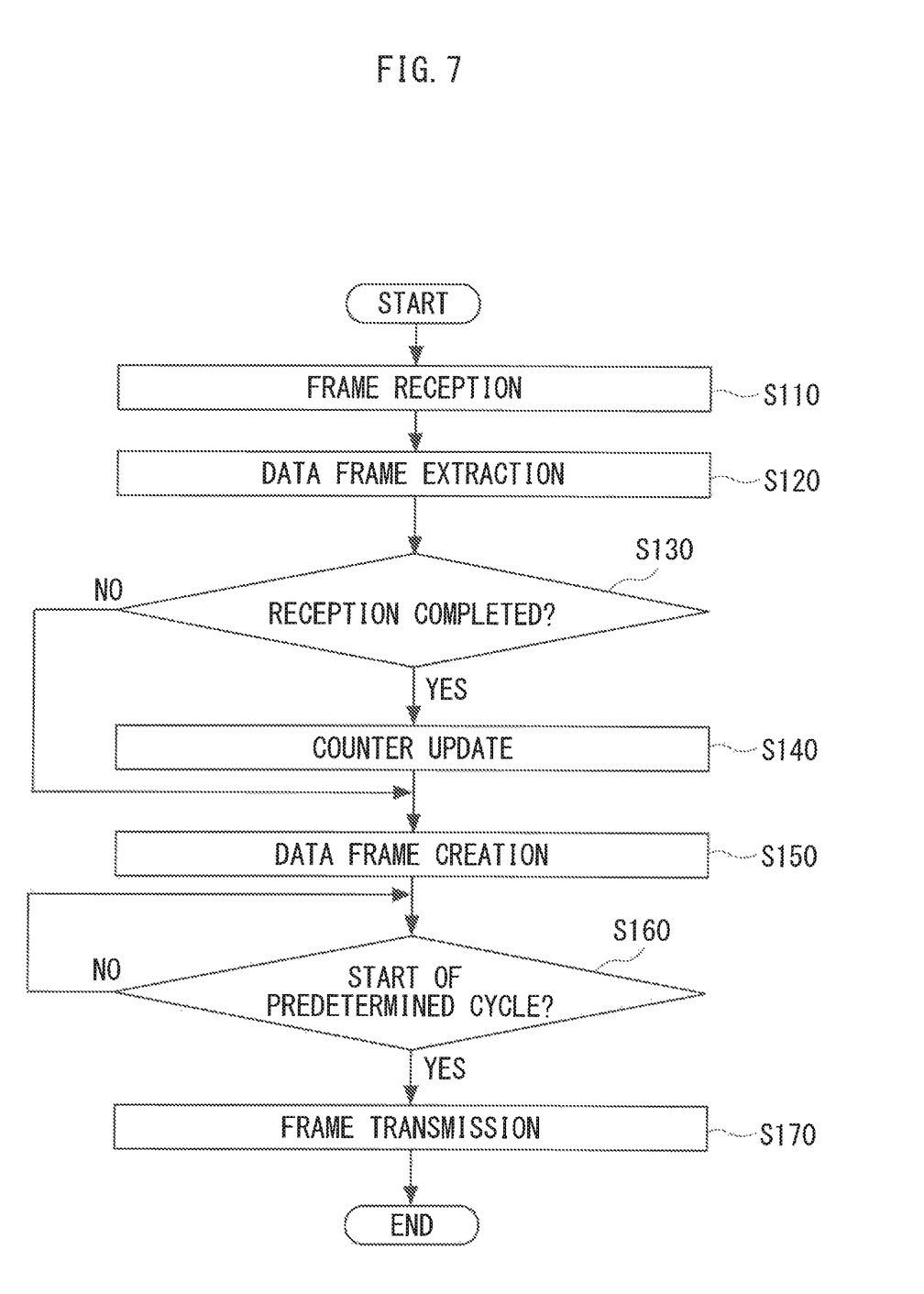
FIG. 7 is a diagram for describing processing for a reception-side node to receive data.

Next, a method of communication between nodes 20 and 20 will be described. FIG. 6 is a diagram for describing processing for a transmission-side node to transmit data, and FIG. 7 is a diagram for describing processing for a reception-side node to receive data.

A transmission-side node periodically performs the processing in FIG. 6, and first, determines whether or not an event of transmission of data occurs (step S5). For example, if data to be transmitted is generated in the function unit 21 in response to, e.g., an operation performed by a user and notification of occurrence of an event is provided from the function unit 21, the transmission-side node determines that an event of transmission of object data has occurred. Here, if no event has occurred (step S5: No), the transmission-side node terminates the processing in FIG. 6.

If such event has occurred (step S5: Yes), the transmission-side node acquires object data (step S10). The object data is, for example, information received from another node or a result of processing in the function unit 21, and in the case of the in-vehicle device 14, is data for screen display of the audio or navigation system.

Next, the transmission-side node refers to the setting information stored in the memory 212 to obtain a CAN-ID corresponding to the object data, and reads counter information for data with this CAN-ID from, the memory 212 and updates the counter information (step S15). For example, in the case of counter information for indicating occurrence of an event, the transmission-side node increments a value of the counter information before occurrence of the event to a value of the updated counter information. Here, update of counter information is not limited to increment and may be decrement. Furthermore, update may be one indicating a status of an event such as a change between characters (character codes) such as N and M or a change between 0 and 1.

Also, if the object data includes a plurality of component elements (element data) and the component elements are divided and transmitted in a plurality of data frames, at least one of information indicating serial numbers for respective data frames in which the component elements are divided, information indicating a last data frame of the data frames in which the component elements are divided and information indicating a total number of the data frames in which the component elements are divided is added to identification information for the respective component elements.

Then, the transmission-side node creates a data frame including the object data, the CAN-ID and the counter information (step S20). In addition to these, information such as an SOF and a CRC is added to the data frame according to the CAN protocol, but description of such addition of the information will be omitted because such addition is a known technique.

Then, the transmission-side node determines whether or not a start of a predetermined cycle has been reached (step S30). Then, if a start of a predetermined cycle has been reached (step 330: Yes), the transmission-side node transmits the data frame to the communication line 10 (step S40). Here, if it is determined in step S30 that a start of a predetermined cycle has not been reached, the transmission-side node waits without transmitting the data (step S30: No).

After step S40, the transmission-side node receives data frames from the communication line 10 (step S50). Then, the transmission-side node extracts a data frame including a CAN-ID that is the same as that of the data frame transmitted in step S40 from the received data frames. In other words, the transmission-side node receives the data frame from a reception-side node. Then, the transmission-side node compares counter information in the data frame received from the reception-side node and the counter information the data frame transmitted in step S40 to determine whether or not reception has been completed (step S60). The counter information in the data frame transmitted in step S40 has a value subsequent to the update in step S15, and thus, if the reception-side node has not completed the reception of the object data, the counter information is different. On the other hand, if the reception-side node has completed the reception of the object data, the counter information in the data frame received in step S50 agrees with the counter information in the data frame transmitted in step S40.

Then, if the transmission-side node determines that the reception has been completed (step S60: Yes), the transmission-side node recognizes that the event of transmission of the object data has been completed and terminates the transmission of the object data (step S70). Consequently, next time the transmission-side node performs the processing in FIG. 6, the transmission-side node creates a data frame with no object data included until occurrence of a new event. For example, when the transmission-side node creates a data frame in step S20, the transmission-side creates a data frame with a CAN-ID and counter information included and with no object data included.

Also, if the transmission-side node determines in step S60 that the reception has not been completed (step S60: No), the transmission-side node terminates the processing in FIG. 6 without terminating the transmission of the object data.

On the other hand, a reception-side node periodically performs the processing in FIG. 7, and first receives data frames from the communication line 10 (step S110). Next, the reception-side node extracts a data frame including a predetermined CAN-ID, that is, a data frame to be used in the relevant device from the received data frames (step S120).

Then, the reception-side node refers to the setting information stored in the memory 212 to determine whether or not the reception-side node has completely received object data corresponding to the CAN-ID (step S130). For example, if the reception-side node has completely received data frames of component elements corresponding to the object data received in step S120, the reception-side node determines that the reception has been completed (step S130: Yes), and if there is a component element not received, the reception-side node determines that the reception has not been completed (step S130: No). Here, where the component elements are divided and transmitted in a plurality of data frames, if the reception-side node has received all the divisional data frames, the reception-side node determines that the component elements have been received, based on identification information added to each data frame.

If the reception-side node determines that the reception has been completed, the reception-side node increments counter information for the object data, the reception of which has been completed, to update a value that is the same as the value of the counter information provided to the relevant object data by the transmission-side node (step S140), and proceeds to step S150. On the other hand, if the reception-side node determines that the reception has not been completed (step S140: No), the reception-side node proceeds to step S150 without updating the counter information.

In step S150, the reception-side node creates a data frame including the counter information for the relevant object data. Next, the reception-side node determines whether or not start of the predetermined cycle has been reached, that is, time passed from last transmission of the data frame of the relevant object data has reached a predetermined period of time (step S160). If the reception-side node determines that a start of the predetermined cycle has not been reached (step S160: No), the reception-side node waits until a start of the predetermined cycle is reached, and if a start of the predetermined cycle has been reached (step S160: Yes), the reception-side node transmits the data frame created in step S150 to the communication line 10 (step S170).

As described above, in the present example, if the reception-side node has completely received object data, the reception-side node can notify the transmission-side node of the completion of the reception, by updating counter information in a data frame to be sent to the transmission-side node. Then, the notified transmission-side node terminates regular communication of the object data and thereby reduces traffic in the communication line 10. Here, even if the regular communication of the object data is terminated, regular communication of a data frame including a CAN-ID and counter information may be performed.

Details of Counter Information

Figure 8:
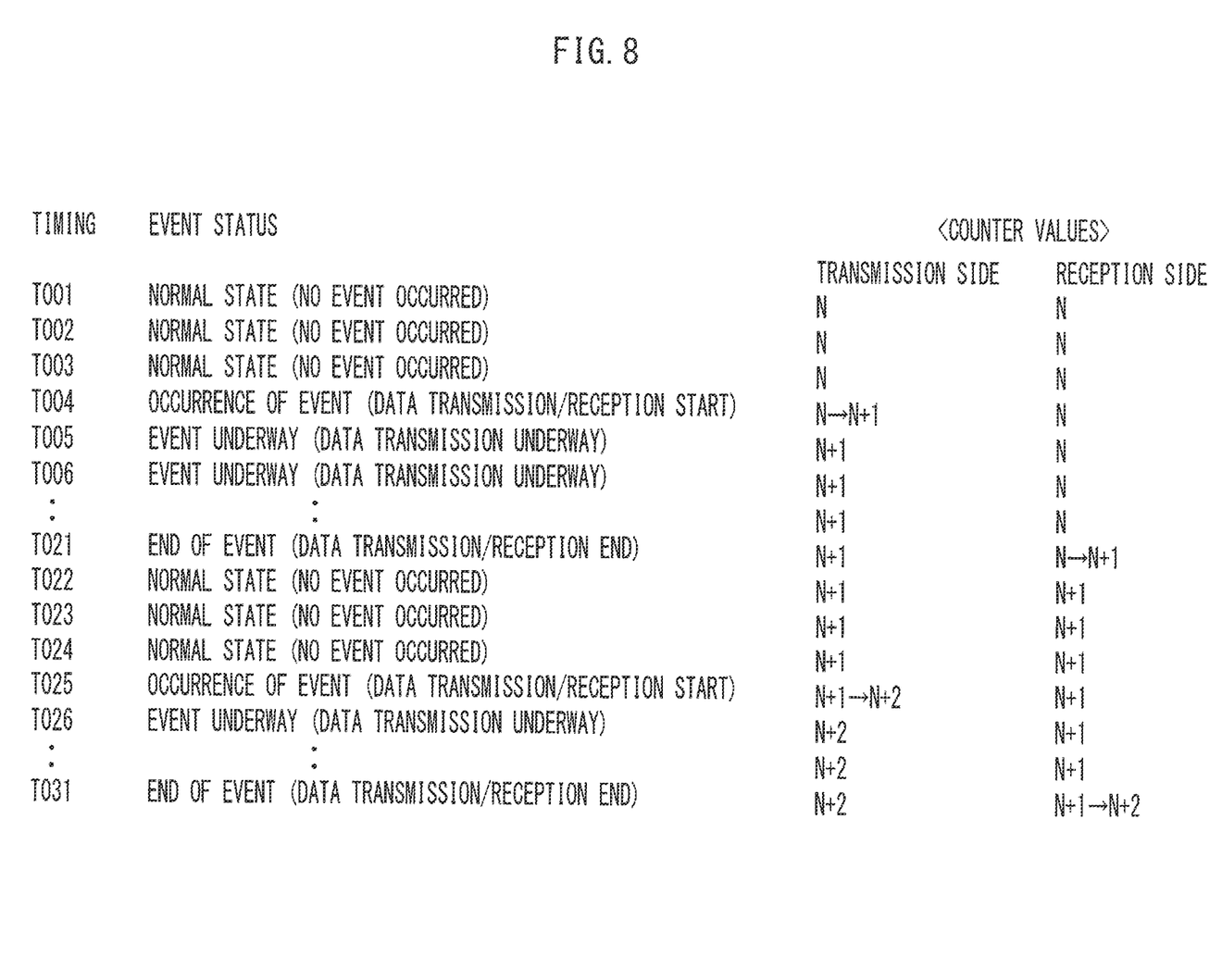
FIG. 8 is a diagram indicating a relationship between a status of an event and counter information values.

FIG. 8 is a diagram indicating a relationship between a status of an event and values of counter information (hereinafter also referred to as "counter value(s)"). In FIG. 8, timings T001 to T003 indicate a normal state in which no event has occurred, and in this case, the counter value in a transmission-side node and the counter value in a reception-side node agree with each other.

Then, upon occurrence of a new event, as at timing T004, the transmission-side node updates the counter value. Thus, at timings T005 to T006, the counter value in the transmission-side node is N+1 subsequent to the update and thus is different from N, which is the counter value that is not updated in the reception-side node, which indicates that an event is underway, that is, transmission of object data is underway.

Then, upon completion of reception of the object data, as at timing T021, the reception-side node updates the counter value. Consequently, it is indicated that transmission and reception of the object data have finished, that is, the event has ended. Thus, at timings T022 to T024, it is indicated that the counter value in the transmission-side node and the counter value in the reception-side node are N+1 subsequent to the update, and thus agree with each other, which indicates a normal state. Then, upon occurrence of a new event, as at timing T025, the transmission-side node further updates the counter value and operation similar to the above is repeated.

Figure 9:
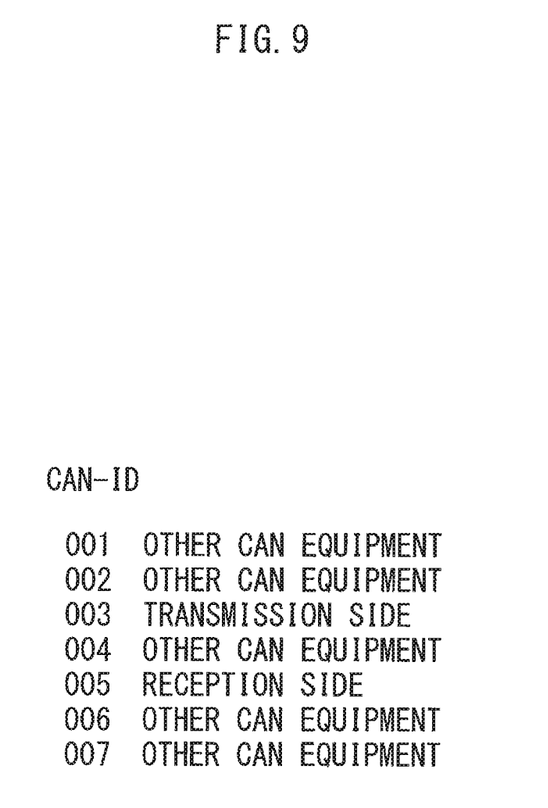
FIG. 9 is a diagram indicating examples of data frames to be broadcasted.

Although in FIG. 8, the counter values in the transmission-side node and the reception-side node between which the object data is transmitted/received, are indicated side by side, in reality, as indicated in FIG. 9, data frames are also broadcasted from other nodes, and a needed data frame is identified according to a CAN-ID from among the data frames to perform processing.

Figure 10:
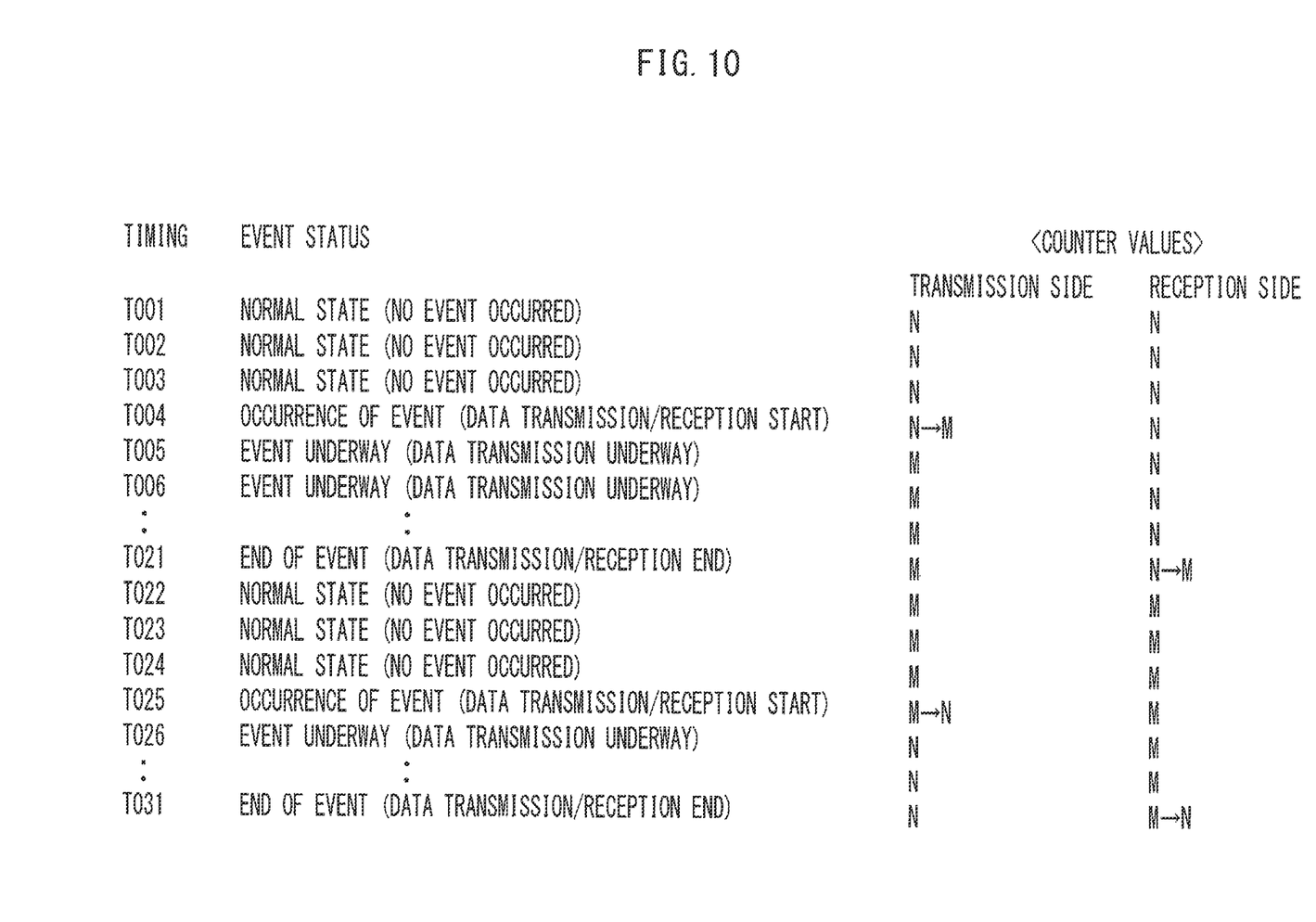
FIG. 10 is a diagram indicating an example using N and M as counter values.

Here, since it is sufficient that the counter values each represent a status of an event and thus, increment is not necessarily employed, but alternate update of two values such as N and M or 0 and 1 may be employed. FIG. 10 indicates an example using N and M as counter values. Also, in these examples, a case where the counter value in the transmission-side node and the counter value in the reception-side node agree with each other indicates a normal state and a case where the counter values do not agree with each other indicates that an event is occurring; however, the settings may be made so that a case where the counter values do not agree with each other indicates a normal state and a case where the counter values agree with each other indicates that an event is underway.

Figure 11:
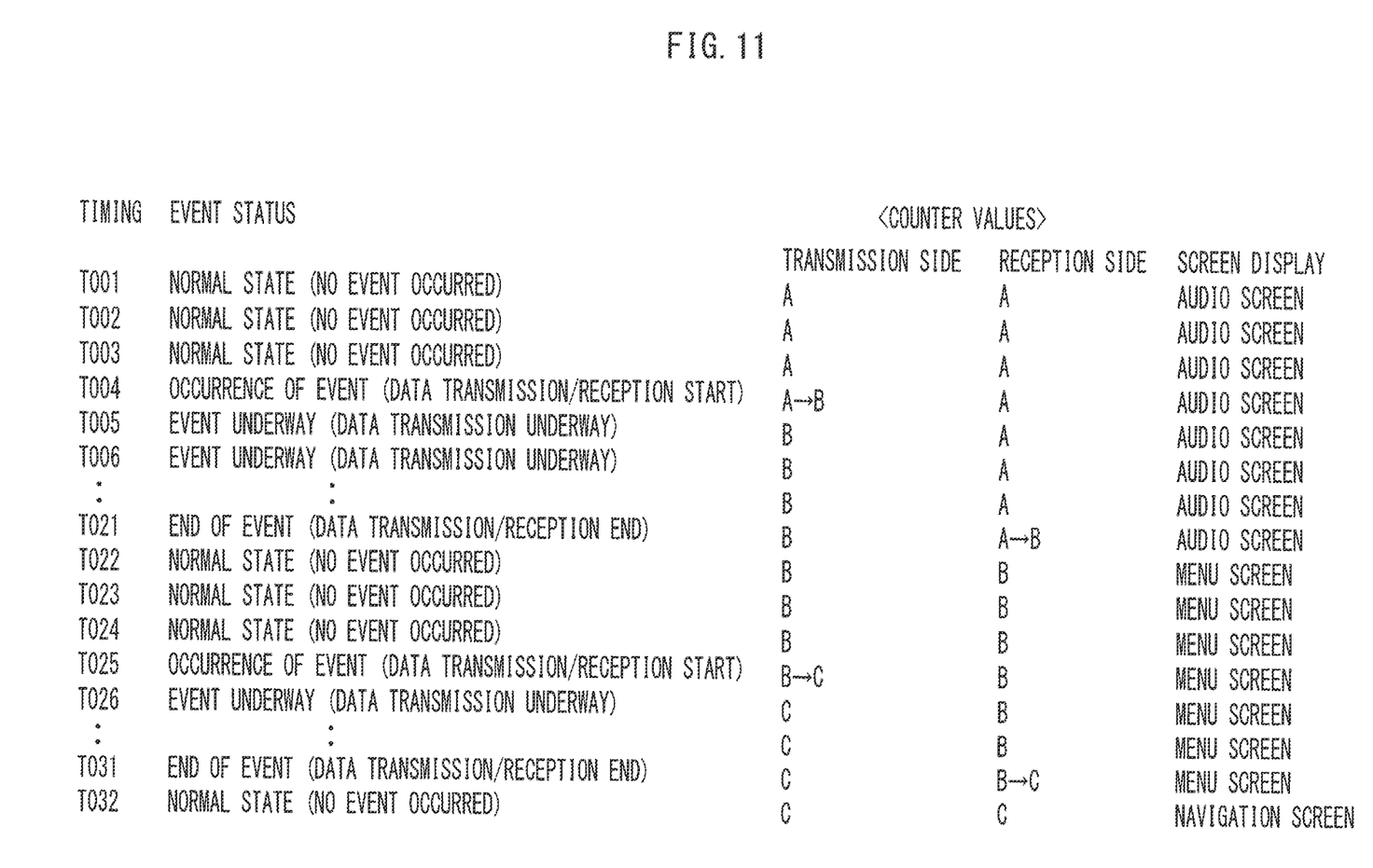
FIG. 11 is a diagram indicating an example using screen IDs as counter values.

Also, the counter values may be IDs corresponding to particular events such as screen transition. FIG. 11 indicates an example using screen IDs as counter values. In FIG. 11, A is an ID for an audio screen, B is an ID for a menu screen and C is an ID for a navigation screen.

As described above, use of screen IDs as counter values enables indication of a screen that is being transmitted/received or a screen that is being displayed, by counter information.

Figure 12:
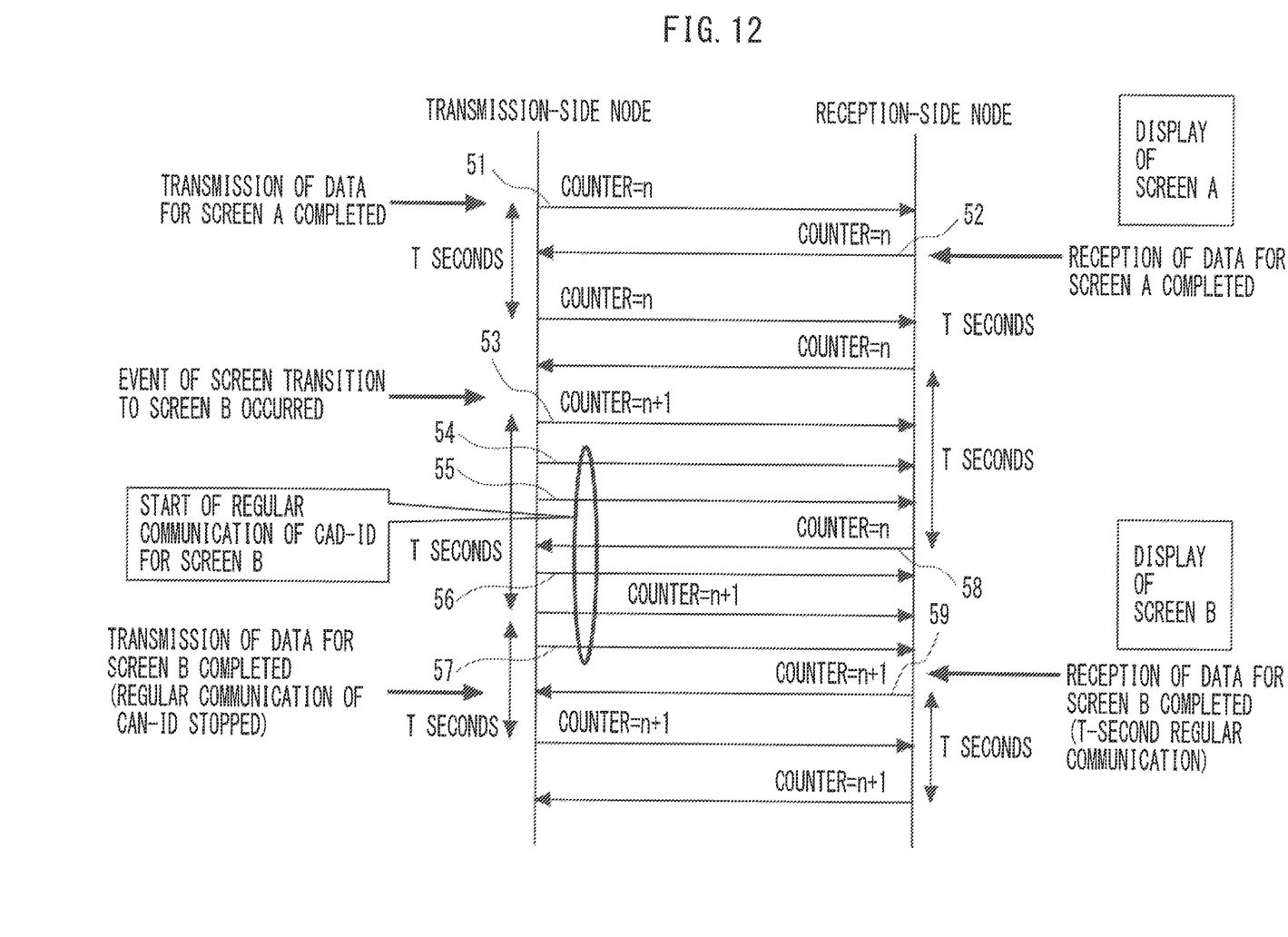
FIG. 12 is a diagram indicating an example of providing notification of completion of reception in regular communication of data for the screen display in FIG. 5(A) and FIG. 5(B).

FIG. 12 is a diagram indicating timings for a transmission-side node and a reception-side node to transmit counter information. As indicated in FIG. 12, at timing 51, a transmission-side node has completed transmission of data for the screen A and a value of counter information (counter value) at this point of time is n, and when the reception-side node has completely received the data for the screen A, the reception-side node increments a last counter value n−1 to update the counter value to n, and at timing 52, transmits a data frame to the transmission-side node. In other words, the transmission-side node is notified of the completion of the reception of the object data identified by a CAN-ID in the relevant data frame.

The transmission-side node notified of the completion of the reception of the object data stops regular communication of the relevant object data and transmits a data frame including the CAN-ID for the relevant object data and the counter information, that is, a data frame not including the content of the data for screen display, in a predetermined cycle (T seconds in the example in FIG. 12) until occurrence of a next screen display event. The reception-side node also transmits a data frame including the CAN-ID for the relevant object data and the counter information in the predetermined cycle until occurrence of a next screen display event. The counter value in this case is the counter value n, which is the same as that in the transmission-side node, because the reception has already been completed. In other words, a normal state in which no event has occurred is indicated.

Then, upon occurrence of an event of transition to the screen B, the transmission-side node updates the value of the counter information to n+1, and transmits a data frame including the counter information at timing 53, and transmits component elements of object data at, e.g., timings 54 to 57.

On the other hand, the reception-side node transmits a data frame including the counter information for the relevant object data to the transmission-side node in the predetermined cycle; however, at timing 58, the reception-side node has received just a part of the component elements forming the relevant object data and transmits the data frame with the last counter value. Thus, the counter value is different between the transmission-side node and the reception-side node, which indicates that transmission/reception of the object data is underway.

Then, when the receptions side node has completely received the object data at timing 59, the reception-side node transmits a data frame with the counter value updated to n+1, which is the same as that on the transmission side and thereby provides notification of the completion of the reception. Here, although in the present example, notification of completion of reception is provided by transmitting a counter value that is the same as that on the transmission side from the reception side, notification of completion of reception is not limited to this example and may be provided by, e.g., sending another value, such as a value next to a counter value on the transmission side.

Also, since a data field of a data frame has a maximum of 8 bytes, a component element may further be divided and transmitted. For example, as illustrated in FIG. 4, where an area in which the content of data can be stored in a data field has 6 bytes and 30 characters each having 2 bytes are transmitted, the component element is transmitted by repeating transmission of a data frame including three characters ten times. In this case, provision of sequential numbers to the data frames as counter information for the component element enables determination of whether or not the reception-side node has completely received the component element.

For example, if one component element is transmitted in ten data frames, sequential numbers of 0 to 9 are provided to the respective date frames. When the reception-side node has received the data frames with the counter values of 0 to 9 with no error in a predetermined cycle and has received a round of the counter values by receiving a data frame with a counter value of 0 following the data frame with a counter value of 9, the reception-side node determines that the component element has completely been received. Also, it is possible that a largest value of the counter information for the relevant component element is set in advance and if counter values of 0 to the largest value (for example, 9) for the received component element has been received with no omission, the reception-side node determines that the component element has completely been received.

Also, it is possible that the largest value of the counter information for the relevant component element is sent from the transmission-side node to the reception-side node and when the counter values of 0 to the largest value for the received component element have been received with no emission, the reception-side node determines that the relevant component element has completely been received. Also, it is possible that a part (for example, 1 bit) of the counter field is used as information indicating an end of the data frame and when the reception-side node has received all data frames from a data frame with a counter value of 0 to the data frame with a counter value in which information indicating an end is recessive with no omission, the reception-side node determines that the relevant component element has completely been received.

As described above, when the reception-side node determines that all data frames for each component element have been received based on counter information for the component element and further determines that all the component elements of object data have been received based on the setting information, the reception-side node determines that the component elements have completely been received.

Effects of Embodiment

In the communication method according to the present example, a transmission-side node and a reception-side node transmits/receives counter information in a predetermined cycle. Also, if a new event of transmission object data has occurred, the transmission-side node updates a value of the counter information and transmits the updated counter information together with the object data to a communication line in the predetermined cycle. Then, the reception-side node receives the object data and the updated counter information, and if the object data corresponding to the updated counter information has completely received, updates a value of the counter information and transmits the updated counter information to the communication line in the predetermined cycle.

Consequently, a status of the event can be grasped based on the counter information. For example, the transmission-side node can recognize that the reception-side node has completed the reception, terminate the regular communication of the relevant component element and thus prevent useless repetition of transmission to reduce traffic. In other words, while using network employing a regular communication-type communication method, data can be transmitted/received in response to an event.

Also, in the communication method according to the present example, if object data includes a plurality of component elements, a transmission-side node provides counter information to each of the component elements and transmits the counter information for the respective component elements together with the component elements, and when a reception-side node has received all the component elements corresponding to the counter information for the respective component elements, the reception-side node updates counter information of the object data.

As described above, when the reception-side node has completely received data of the component elements included in the object data, the reception-side node updates the counter information to indicate the completion of the reception, enabling the transmission-side node to recognize the completion of the reception.

Also, in the communication method according to the present example, where a component element is divided and transmitted in a plurality of data frames, at least one of information indicating serial numbers provided to the respective data frames in which the component element is divided, information indicating a last data frame of the data frames in which the component element is divided and information indicating a total number of the data frames in which the component element is divided is added to identification information for the respective component elements.

Consequently, the reception-side node can recognize an end of the plurality of divisional component elements and/or a total number of the divisional component elements, enabling highly-accurate detection of completion of reception of the data of the component elements.

Also, the communication method according to the present example is applied to a case where upon occurrence of a screen transition event, data for screen display is transmitted as the object data.

Consequently, even if data for a wide variety of screen display is transmitted via a network employing regular communication, the communication can be performed with reduced traffic in the network.

Also, in the data for screen display, ID information is set for each screen display and each of component elements included in the screen display.

Consequently, even with a network employing a data frame with a limited data field, data for screen display can properly be transmitted.

Although an embodiment of the present invention has been described above, the embodiment is definitely a mere example, and the present invention is not limited to the embodiment, and various changes based on knowledge of a person skilled in the art are possible without departing from the spirit of the claims.

What is claimed is:

1. A communication method for a transmission-side node and a reception-side node performing transmission and reception via a communication line that connects the transmission-side node and the reception-side node, in a predetermined cycle, the communication method comprising:
    causing the transmission-side node to transmit transmission-side identification information indicating a status of an event of transmission of object data to the communication line in the predetermined cycle;
    when a new event of transmission of the object data occurs, causing the transmission-side node to update a value of the transmission-side identification information and transmit the updated transmission-side identification information together with the object data associated with the new event to the communication line in the predetermined cycle; and
    causing the reception-side node to receive the object data associated with the new event and the updated transmission-side identification information, and upon completion of reception of the object data associated with the new event, update a value of reception-side identification information to be identical to the value of the updated transmission-side identification information and transmit the updated reception-side identification information to the communication line in the predetermined cycle,
    wherein the transmission-side node continues to transmit the updated transmission-side identification information and the object data until the transmission-side node receives the updated reception-side identification information from the reception-side node, and the transmission-side node subsequently terminates the transmission of the object data associated with the new event, and
    the transmission-side node is an in-vehicle equipment device, the reception-side node is another in-vehicle equipment device, and the communication line is an in-vehicle network.

2. The communication method according to claim 1, wherein the event is a screen transition and the object data is data for screen display.

3. The communication method according to claim 1, wherein
    when the new event of transmission of the object data occurs, prior to the completion of the reception of the object data associated with the new event by the reception-side node, the reception-side node transmits the reception-side identification information having a previous value that is different from the value of the updated transmission-side identification information to the communication line in the predetermined cycle.

4. The communication method according to claim 1, wherein the causing the reception-side node to receive the object data associated with the new event and the updated transmission-side identification information includes: during incompletion of reception of the object data associated with the new event, transmitting the un-updated reception-side identification information to the communication line in the predetermined cycle, and upon completion of reception of the object data associated with the new event, updating a value of the reception-side identification information and transmitting the updated reception-side identification information to the communication line in the predetermined cycle.

5. The communication method according to claim 1, wherein:
    the object data includes a plurality of element data, and the transmission-side node provides the transmission-side identification information to each of the element data and transmits the transmission-side identification information for each of the respective element data together with each of the respective element data; and
    upon completion of reception of the element data corresponding to the transmission-side identification information for each of the respective element data, the reception-side node updates the reception-side identification information for the object data.

6. The communication method according to claim 5, wherein the object data is data for displaying a screen, the element data is data for displaying elements included in the screen, and the transmission-side identification information is provided to each of the element data.

7. The communication method according to claim 5, wherein when the element data is divided and transmitted in a plurality of data frames, at least one of information indicating serial numbers provided to the respective data frames in which the element data is divided, information indicating a last data frame of the data frames in which the element data is divided and information indicating a total number of the data frames in which the element data is divided is transmitted with the transmission-side identification information for the respective element data.

8. A communication method for a transmission-side node and a reception-side node performing transmission and reception via a communication line that connects the transmission-side node and the reception-side node, the communication method comprising:
    controlling the transmission-side node to detect that an event has occurred;
    controlling the transmission-side node to acquire data regarding the event;
    controlling the transmission-side node to update counter information in response to detecting the event;
    controlling the transmission-side node to generate a data frame including the counter information and object data associated with the event;
    controlling the transmission-side node to transmit the data frame to the communication line;
    controlling the reception-side node to receive the data frame, and transmit the data frame to the communication line;
    controlling the transmission-side node to receive the data frame from the communication line and the reception-side node;
    controlling the transmission-side node to compare the counter information in the transmitted data frame to counter information in the received data frame;
    controlling the transmission-side node to continually transmit the object data in the data frame until the transmission-side node determines that the counter information in the transmitted data frame is equal to the counter information in the received data frame; and
    controlling the transmission-side node to terminate the transmission of the object data in the data frame in response to the determining that the counter information in the transmitted data frame is equal to the counter information in the received data frame, wherein the transmission-side node is an in-vehicle equipment device, the reception-side node is another in-vehicle equipment device, and the communication line is an in-vehicle network.

* * * * *